Sept. 16, 1969  L. F. BONACCI  3,467,380
COMBINED FOOTBALL CENTERING DEVICE AND PASS-RECEIVING DEVICE
Filed Jan. 12, 1967  4 Sheets-Sheet 1

INVENTOR
Louis F. Bonacci

BY Clive H. Bramson
ATTORNEY

Sept. 16, 1969    L. F. BONACCI    3,467,380
COMBINED FOOTBALL CENTERING DEVICE AND PASS-RECEIVING DEVICE
Filed Jan. 12, 1967    4 Sheets-Sheet 2

INVENTOR
Louis F. Bonacci
BY Clive H. Bramson
ATTORNEY

Sept. 16, 1969   L. F. BONACCI   3,467,380
COMBINED FOOTBALL CENTERING DEVICE AND PASS-RECEIVING DEVICE
Filed Jan. 12, 1967   4 Sheets-Sheet 4

INVENTOR
Louis F. Bonacci
BY Clive H. Bramson
ATTORNEY

United States Patent Office 3,467,380
Patented Sept. 16, 1969

3,467,380
COMBINED FOOTBALL CENTERING DEVICE AND
PASS-RECEIVING DEVICE
Louis F. Bonacci, R.R. 1, Box 381,
Holtsville, N.Y. 11742
Filed Jan. 12, 1967, Ser. No. 608,920
Int. Cl. A63b 67/00
U.S. Cl. 273—55                                    11 Claims

ABSTRACT OF THE DISCLOSURE

An apparatus including a structure resembling the center of a football team having an arm that is capable of repeatedly snapping a football into a play position adjacent the buttocks of the simulated center. The arm is automatically moved to and from the play position to consecutively supply different footballs to the play position for individual withdrawal therefrom by the user of the apparatus. A simulated football-receiving player is arranged to move on a track away from the simulated center as the arm moves into the play position.

---

This invention relates generally to football practice devices and more particularly to apparatus adapted to automatically simulate the action of a center member of a football team and of a pass-receiving member of the team, thereby enabling a user of the apparatus to repeatedly accept a snapped-back football from the simulated center and pass the ball to a moving simulated pass-receiver.

Whereas the skillful performance of the football quarterback dually involves the proper acceptance of the ball from the center and accuracy in passing the ball to a moving receiver, the primary desideratum of the present invention resides in the provision of a single apparatus capable of facilitating practice of both of the foregoing under game-simulating conditions.

Although various devices have been devised heretofore, for the purpose of developing the accuracy of a passer or for the purpose of duplicating the football snap-back action of a center, such devices have not combined, in an automated manner, both of these functions whereby the aforesaid essential skills of the quarterback can be practiced with the aid of a single coacting apparatus. Moreover, the instant invention further provides an apparatus capable of repeatedly feeding a plurality of footballs, upon demand and in succession, to the user thereof, thus eliminating the need for pre-setting a football within the apparatus for each practice play. In view of the rapidity, therefore, with which the apparatus can be utilized, its application to the ends of facilitating and expediting football practice for amateur and professional players alike as well as for amusement purposes will be readily appreciated.

Accordingly, and consonant with the foregoing, the instant invention has for a general object the provision of a football-passing apparatus including means simulating the action of the center and receiving players of a football team, the user of the invention being able to practice the essential actions of a quarterback in cooperation with the automated assistance of the invention.

Another object of the present invention is to provide a device of the foregoing character which includes ball-holding means capable of snapping a football into a play position in response to the signal of the user.

A further object of this invention resides in the provision of a football-passing apparatus including means which will enable the user to select a play involving the direction of movement of the simulated receiver of the pass.

Another object of the present invention is to provide a device in accordance with the foregoing which includes trigger means situated externally of the simulated center for actuating the play.

Still another object of the instant invention is to provide a football-passing apparatus including a simulated pass-receiving member of the team having a loop-shaped torso serving as a target.

Another general object of the present invention is to provide a device of the described character which will be simple in structure, economical of manufacture and highly effective in use.

Other objects and advantages of the instant football-passing apparatus will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description, serve to explain the principles of the invention.

Figure 1:
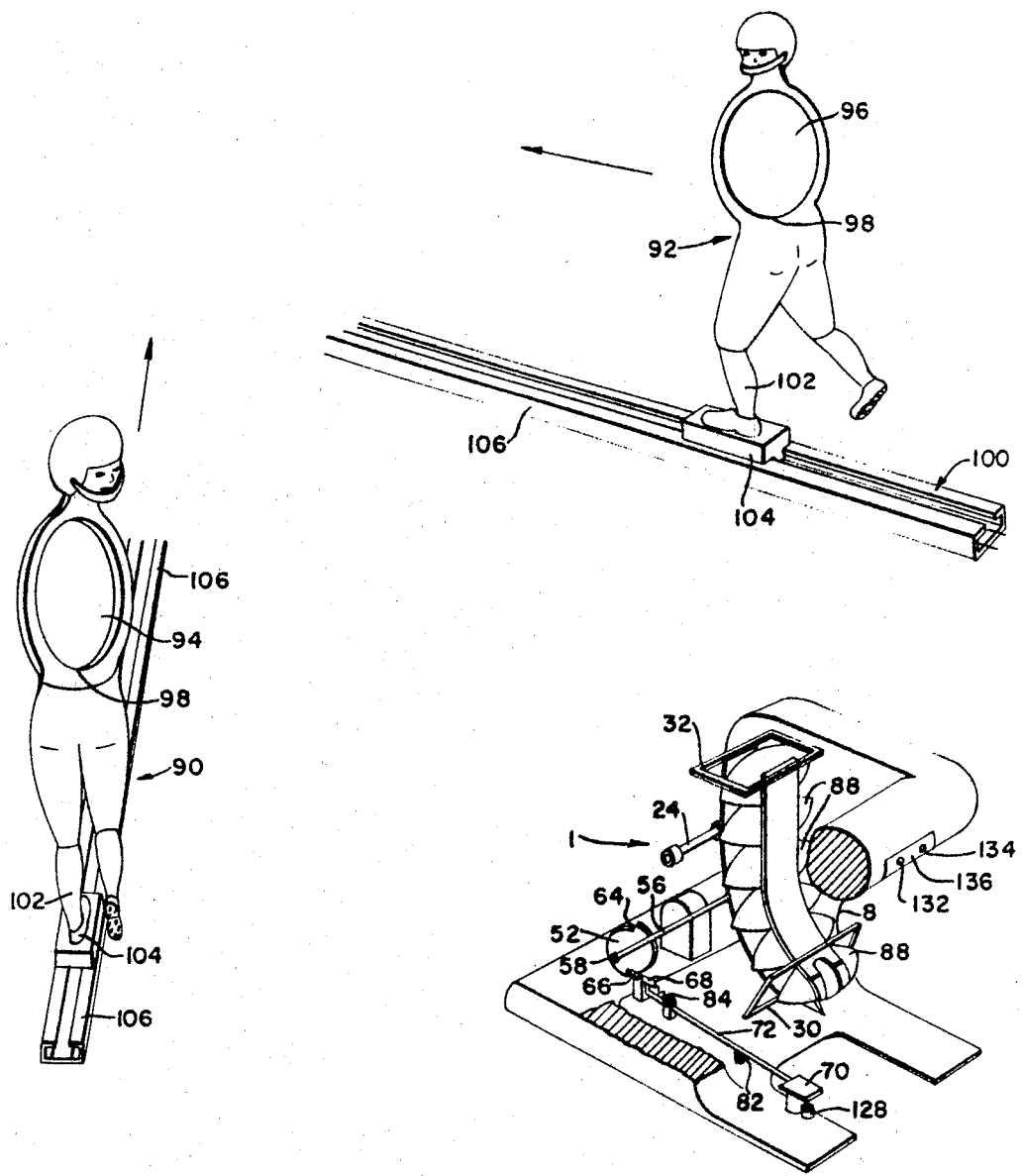
FIGURE 1 is a perspective view of the football-passing apparatus illustrating the relative arrangement of the simulated center and simulated receiver components.

Referring now in detail to the present preferred embodiment of the invention illustrated in the accompanying drawings, FIGURE 1 shows the associated arrangement of the football center and receiving components thereof.

Figure 2:
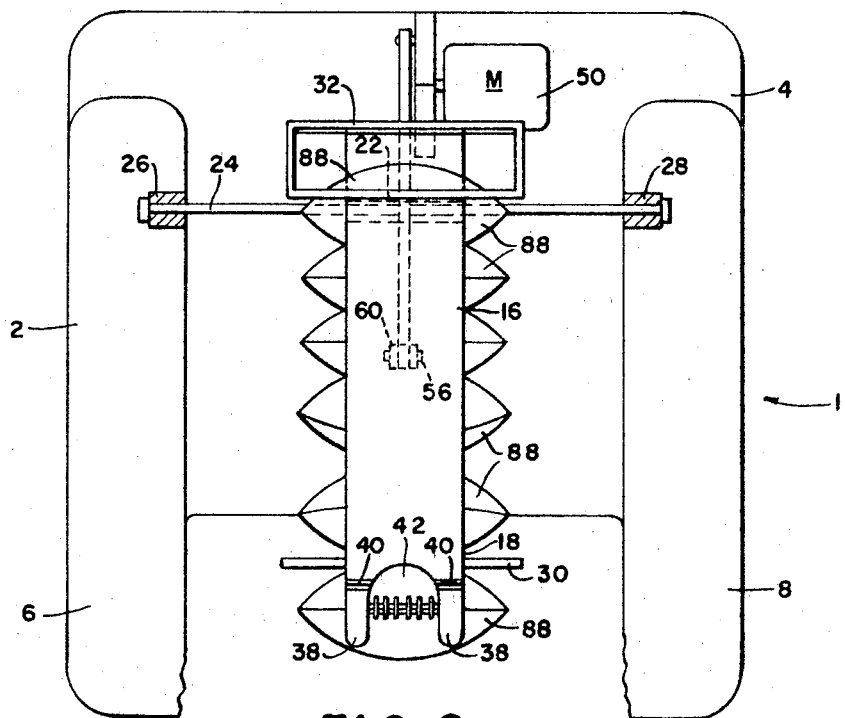
FIGURE 2 is a rear elevational view of the simulated center.
Figure 3:
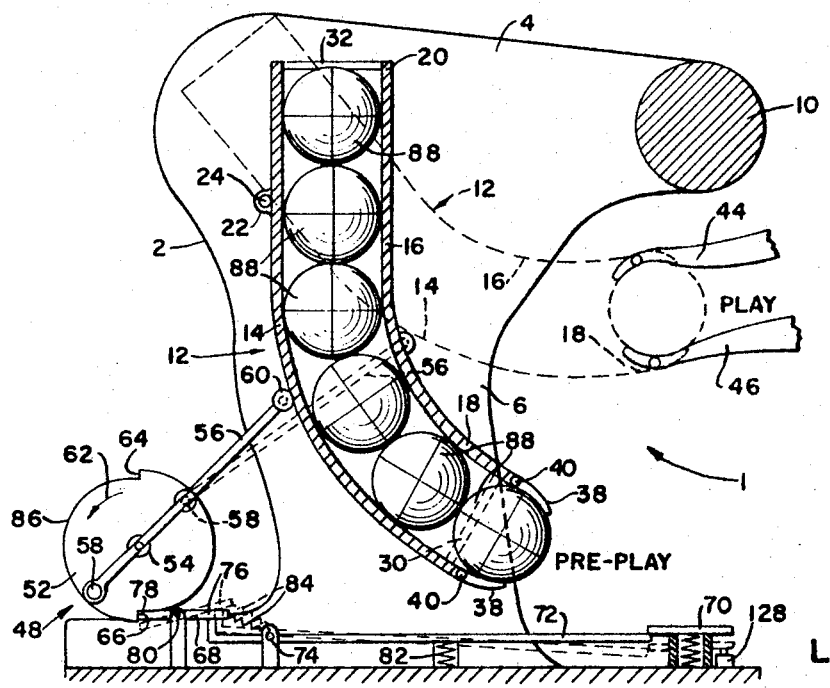
FIGURE 3 is a side elevational view thereof illustrating the means for motivating the ball-holding means and the preplay and play positions of the latter.
Figure 4:
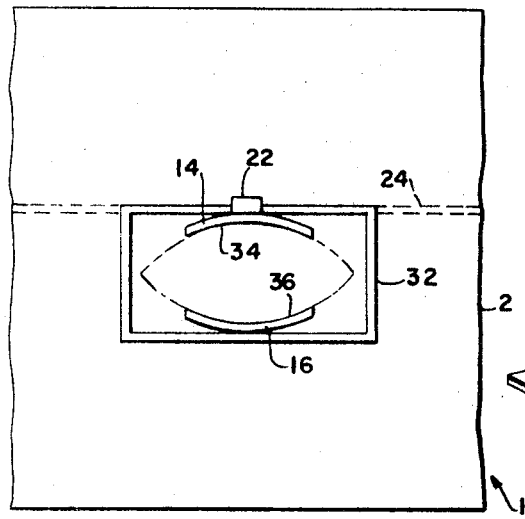
FIGURE 4 is a top plan view thereof illustrating the ball-receiving end of the ball-holding means.

More specifically, and with reference to FIGURES 2–4 of the drawings, the simulated football center is shown designated generally by numeral 1 in the various positions as heretofore described. The center includes a frame structure 2 having an upper portion 4 and a support member comprised of a pair of spaced legs 6 and 8 depending from said upper portion, the latter also including buttocks-simulating portion 10 as shown.

Football-holding means generally designated by numeral 12 includes a pair of spaced walls 14 and 16, a ball-dispensing end 18 and a ball-receiving end 20, the general configuration thereof being elongate and arcuate inwardly of the ball-dispensing end as shown, a plurality of footballs being receivable between said side walls in columnar manner.

Said ball-holding means is provided with a bearing sleeve member 22 extending horizontally along wall 14 as shown, said sleeve being secured to said wall by welding or other suitable means or may be integral therewith where formed, e.g., of a single casting. Pivot bar 24 which is secured to said frame structure at support members 26 and 28, extends slidably through said sleeve 22 to thereby pivotally support said ball-holding means whereby the ball-dispensing end 18 of the latter is movable between the PRE-PLAY and PLAY positions indicated.

Figure 5:
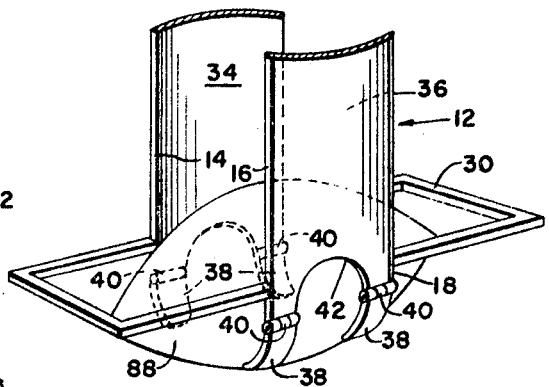
FIGURE 5 is an enlarged fragmentary perspective view of the ball-dispensing end of the ball-holding means.

With reference now to FIGURE 5 of the drawings wherein said ball-holding means is partially seen in enlarged form, a wall-spacing brace 30 is shown connecting walls 14 and 16 inwardly of the lower end 18 thereof, another wall-spacing brace 32 being provided near the ball-receiving end as well as shown in FIGURES 2 and 3. In view of the unobstructing rectangular configuration of said brace members 30 and 32, one or more footballs can be received between said spaced walls 14 and 16 and pass freely from said receiving end 20 to the dispensing end 18 of said ball-holding means. Further, by reason of the concave curvature of the inner surfaces 34 and 36 which conform to the general longitudinal curvature of a football, the movement of the latter between said walls is facilitated to preclude jamming or otherwise interfere with the smooth feeding of footballs to the dispensing end 18.

Yieldable ball retention fingers 38 which are hinged to said respective walls 14 and 16 at areas 40 as shown, are arranged to be inwardly biased whereby a football arriving at said dispensing end 18 will be releasingly gripped, the inward bias of said fingers being overcome by the user of the apparatus as a football is withdrawn from the dispensing end by said user. The yieldable and inwardly biased character of said fingers, it will be appreciated, can be achieved by other suitable means, such as, e.g., where said fingers are integral with said walls 14 and 16, are tensioned or pre-set in an inwardly facing manner as shown, and which when spread by the withdrawal of a football, will spring back to the normally pre-set position subsequent to the removal of the football. The open region 42 is provided to permit expedient gripping of the football by the user of the apparatus, the grasping manner of hands 44 and 46 being shown in FIGURE 3 of the drawings.

Figure 9:
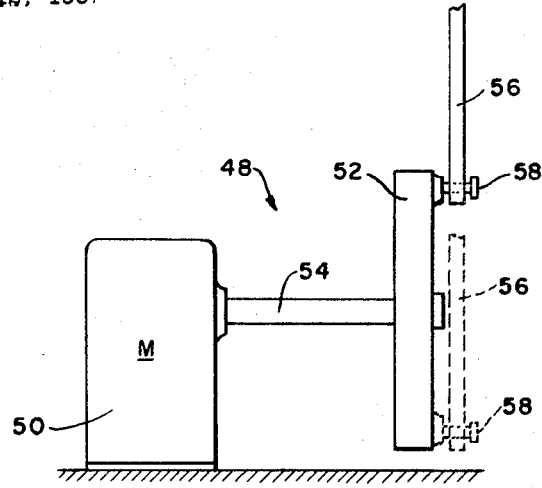
FIGURE 9 is a fragmentary side elevational view of the motivating means for pivoting the ball-holding means between the pre-play and play positions.

The means for motivating the ball-holding means 12 to and from the aforedescribed pre-play and play positions is generally designated by numeral 48 and is particularly illustrated in FIGURES 3 and 9 of the drawings. In the embodiment shown said motivation means includes a prime mover 50 which is an electric motor and a rotatable member or disc 52 which is drivingly connected to said motor via drive shaft 54. Connecting rod 56 is pivotally secured to said disc 52 at pin 58 at one end and pivotally secured at the other end to ear 60 which projects from wall 14 of said ball-holding means as shown. Accordingly, by dint of the eccentric connection of said connecting rod to said disc, rotation of the latter in the direction of arrow 62 through 180 degrees will cause pivotal movement of said ball-holding means to either the pre-play or play positions. That is, when pin 58 is in solid-line position, said ball-holding means will be in the pre-play position and when in 58 is in the broken-line position, means 12 will be in the play position. To predetermine the locations of the foregoing positions, clutch-bar-engaging cam means 64 and 66 are provided peripherally of said disc, clutch bar 68 being controllably engageable with each of said cam means 64 and 66. Thus upon depression of foot-pedal 70 by the user of the apparatus, lever 72 which is pivotally fulcrummed at 74, will act upwardly against end 76 of said clutch bar 68 whereby end 78 thereof will pivot downwardly about fulcrum 80 to thereby disengage with respect to either cam means 60 or 64 whereupon said disc 52 will be rotated by motor 50. Depression of foot-pedal 70 will effect a momentary disengaging action with respect to said clutch bar and said cam means inasmuch as said foot-pedal, in the depressed position, will by-pass said lever 72, the latter then being urged upwardly to its normal position by compression spring 82 notwithstanding the still-depressed position of said foot-pedal. Once said lever 72 resumes its normal non-depressed position, tension spring 84 will cause clutch bar 68 into sliding engagement with periphery 86 of said disc whereupon the cam means other than the one precedingly engaged will be engaged to stop and retain said disc against further rotation. Subsequent depressions of said foot-pedal will effectuate succeeding 180-degree rotational movements of said disc in the aforedescribed manner to thus enable selective placement of said ball-holding means in either the pre-play or play positions.

As shown in the drawings and as aforementioned herein, a plurality of footballs 88, preferably six in number, are receivable within the walls of said ball-holding means. Upon removal of one ball while means 12 is in the play position and return of said means 12 to the pre-play position, the column of balls will move downwardly due to gravity and further, due to the inertial force created by the sudden arrestment of said means 12 in the pre-play position. The inertial force is highly effective to the end of seating the next ball at the dispensing end 18 of said ball-holding means and within the grap of said fingers 38 thereof, whereby said ball is suitably placed for the next play.

Figure 6:
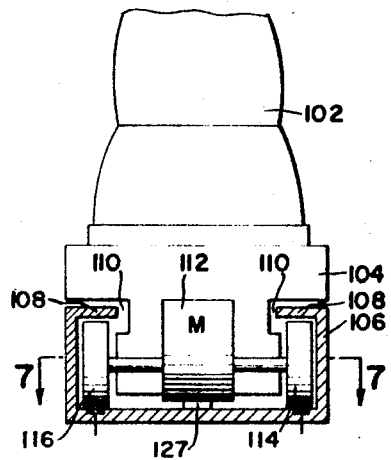
FIGURE 6 is a front elevational view of the shoe of the simulated center as movably received within the guide track shown in FIGURE 1.
Figure 8:
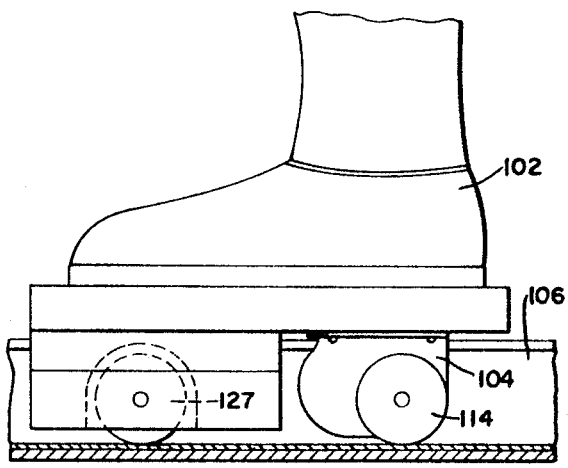
FIGURE 8 is a side elevational view of the shoe of the simulated center.
Figure 7:
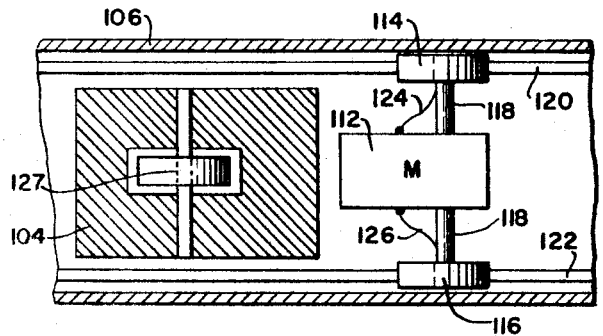
FIGURE 7 is a view taken along line 7—7 of FIGURE 6.

The simulated receivers or ball-receiving means are generally designated by numerals 90 and 92, respectively, said receivers having hoop-like openings 94 and 96 provided integrally therewithin, said openings being sufficiently large to permit the passage of a football therethrough. Preferably, said openings are egg-shaped and are approximately 5 feet and 4 feet with respect to the larger and smaller dimensions thereof. The lower ends 98 of said openings are approximately 3 feet from track 100, the latter being located at ground level. As shown in FIGURES 6–8 one foot 102 of a simulated receiver is mounted upon a wheel-driven and rolling member 104, the latter being arranged to ride in a track 106 which is longitudinally flanged to provide shoulders 108 which are received within longitudinal grooves 110 to thereby slidingly secure said member 104 to said track 106. Electric motor or drive means 112 is mounted upon said member 104 and is drivingly connected to wheels 114 and 116 through axle 118, said wheels being electrically conductive at the peripheries thereof, the power required to operate said motor 112 being picked-up by said wheels from the non-insulated electric current-carrying conductors 120 and 122 provided along the course of said track 106. Conductor wires 124 and 126 are provided to carry the current from conductors 120 and 122, respectively, to said motor 112 thereby completing the circuit thereto when said conductors are energized. Front wheel 127 is provided as shown to further facilitate the movement of said rolling member 104 within track 106.

Figure 10:
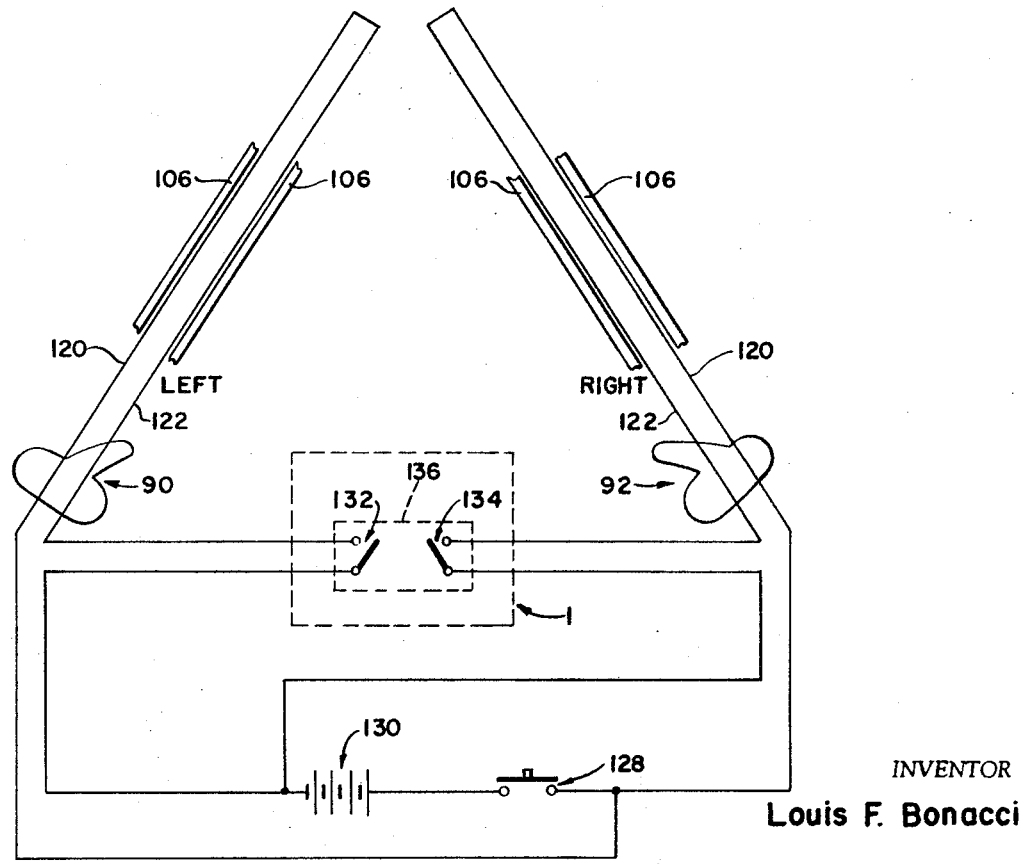
FIGURE 10 is a wiring diagram illustrating the play-actuating switch and the play-selection switches, a power source and the provision of the power source to the track means.

With reference now to FIGURE 10 of the drawings, the circuitry of the present apparatus will be observed, the essential elements of the apparatus being also included schematically therein. When viewed in conjunction with FIGURE 3, it will be appreciated that depression of foot-pedal 70, in accordance with the foregoing disclosure, will also actuate switch 128, the latter being of the type that will alternately close and open a circuit upon each successive actuation thereof. That is, presuming said switch to be in the open position shown in FIGURE 10, actuation thereof will close said switch, such closure continuing until actuation of said switch is again effectuated. When in the closed position, power from source 130 will flow through the circuit completed by conductors 120 and 122 and flow through the left and right track paths when both of switches 132 and 134 are closed. Where, however, switch 132 is closed and switch 134 remains open, the left track only will be energized and conversely, only the right track will be energized if only switch 134 is closed. Where, e.g., the left track is energized, simulated receiver 90 will, upon driving rolling member 104, move out along the left track 106, in a direction away from the simulated center apparatus 1, the user of the apparatus, at this time, accomplishing a forward pass to said simulated receiver, the football being passed having previously been snapped-back to the user by the simulated center.

Within control panel 136 located within the upper portion 4 of said frame structure of the simulated center, switches 132 and 134 are accessible to the user whereby prior to each motivation of the ball-holding means to the play position, the user may select the play he desires, i.e. energization of either the left or right track. It will be appreciated that the number and arrangement of the tracks utilizable may be varied within the contemplation of the invention, another switch being readily includable for each additional track required. Further, each rolling member 104 can be provided with motor-reversing means which will be actuated once the simulated receiver reaches the end of its course, whereby said receiver will automatically return to its starting position at the end of each play.

In operation, the user of the present apparatus will stand behind the simulated center 1 and after having selected the play desired in accordance with the foregoing, will place his hand 44 beneath the buttocks portion 10, step on foot-pedal 70 and withdraw a football snapped-back to him and in play position using his hands 44 and 46 as shown in FIGURE 3 of the drawings. At this time the selected simulated receiver will be moving out into the field. The user or passer will then pass the football attempting to direct the latter through the hoop-like region of the receiver. Upon completion of the play, the foot-pedal is again depressed and the ball-holding means 12 will automatically return to the pre-play position, another football having been automatically deposited into the dispensing end 18 thereof.

It will be understood that the present invention may be coin-operated where used in amusement parks, e.g. The apparatus may also be utilized on football fields by amateur and professional players for serious practice purposes.

Although the preferred embodiment of the football-passing apparatus has been described, it will be understood that within the purview of this invention various changes may be made in the forms, details, proportion and arrangement of parts, the combination thereof and mode of operation, which generally stated consists in a device capable of carrying out the objects set forth, as disclosed and defined in the appended claims.

What is claimed is:

1. A football-passing apparatus comprising a simulated center device and a ball-receiving means, said center device including a ball-holding means and means for moving said ball-holding means from pre-play to play positions, said play position being proximate to the user of the apparatus and said pre-play position being located remotely therefrom, said ball-receiving means including means for moving said ball-receiving means away from said center device, and control means for concurrently actuating both said moving means whereby movement of said ball-receiving means will commence as said ball-holding means is moved to the play position.

2. A football passing apparatus according to claim 1 wherein said means for moving said ball-receiving means comprises an electrically energizable motor, track means for guiding the path of said ball-receiving means, said track means being provided with an electric current-carrying circuit along the course thereof, first switch means in circuit with said electric current-carrying circuit, said control means for concurrently actuating both said moving means, when depressed by the user, being arranged to close or open said first switch means to thereby respectively cause energization or deenergization of said motor.

3. A football-passing apparatus as defined in claim 1 wherein said ball-receiving means comprises a football player-simulating member, said member including a hoop-like opening integral therewith, said opening being sufficiently large to permit the passage of a football therethrough.

4. A football-passing apparatus as defined in claim 3 wherein said ball-receiving means comprises a plurality of football palyer-simulating members, a plurality of track means each adapted to guide the path of a respective player, the paths of each player differing from one another.

5. A football-passing apparatus as defined in claim 4, second switch means in series with the electric current-carrying circuit of each said track means, respectively, said second switch means being positionable to selectively open or close the circuit of each track means independently of said first switch means when the latter is in closed position.

6. A football-passing apparatus as defined in claim 5 wherein said second switch means is located within said center device.

7. A football passing apparatus according to claim 1 wherein said ball-holding means is elongate whereby a plurality of footballs is receivable therein.

8. A football passing apparatus according to claim 7 wherein said ball-holding means has a ball-receiving end located at one end thereof and a ball-dispensing means at the other end thereof, said ball-holding means being pivotally aranged for movement from the pre-play to the play position.

9. A football passing apparatus according to claim 1 wherein said means for moving said ball-holding means includes a prime mover, a rotatable member driven by said prime mover, and a connecting rod inter-linking said ball-holding means and said rotatable member, rotation of said rotatable member being adapted to move said ball-holding means toward and away from said rotatable member.

10. A football passing apparatus according to claim 9 wherein said rotatable member comprises a disc, one end of said connecting rod being pivotably and eccentrically secured to said disc, the other end of said rod being pivotally secured to said ball-holding means.

11. A football passing apparatus according to claim 10 wherein said disc includes clutch-engaging means, and clutch means controllably engageable with said clutch-engaging means, said clutch-engaging and clutch means being cooperable to predeterminably control the rotational movement of said disc.

References Cited

UNITED STATES PATENTS 3,391,936   7/1968   Grimes _____ 273—55
2,767,985  10/1956   Maxcey et al. _____ 273—55

RICHARD C. PINKHAM, Primary Examiner

T. BROWN, Assistant Examiner

U.S. Cl. X.R.
273—105, 105.2